(No Model.)
L. HECKMANN.
ORNAMENTAL CHAIN.
No. 299,138. Patented May 27, 1884.
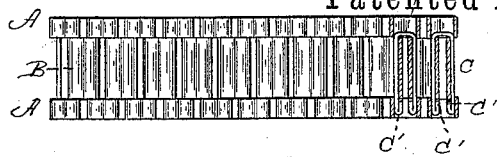
Fig. 1.
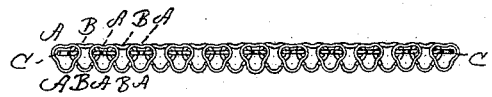
Fig. 2.
Fig. 3.
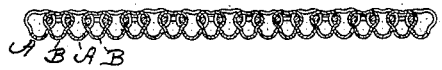
Fig. 4.
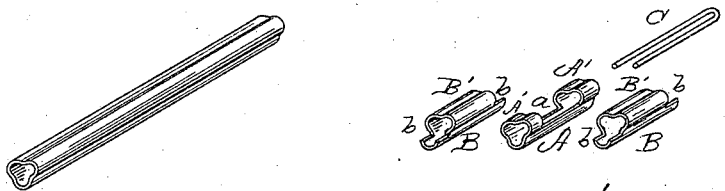
Fig. 5.      Fig. 6.
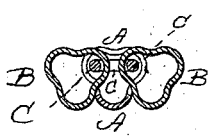
Fig. 7.
     
Fig. 8.      Fig. 9.
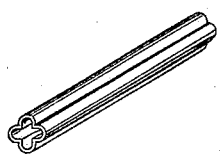
Fig. 10.
WITNESSES
Joseph Ashbaugh
B. W. Williams
INVENTOR
Louis Heckmann
By his Att'y
Henry W. Williams

UNITED STATES PATENT OFFICE.

LOUIS HECKMANN, OF WRENTHAM, MASS., ASSIGNOR OF TWO-THIRDS TO EDWARD P. DAVIS AND WILLIAM H. WADE, BOTH OF SAME PLACE.

ORNAMENTAL CHAIN.

SPECIFICATION forming part of Letters Patent No. 299,138, dated May 27, 1884.

Application filed January 9, 1884. (No model.)

*To all whom it may concern:*

Be it known that I, LOUIS HECKMANN, of Wrentham, in the county of Norfolk and State of Massachusetts, have invented new and useful Improvements in Ornamental Chains and Bracelets, of which the following is a specification.

This invention relates to that class of bracelets and chains consisting of short tubes transversely laid and connected together by wires. In my improvement the tubes are of trefoil or quarterfoil tubing, known in the trade as "clover-leaf wire," said tubes being connected by wire staples, constructed as described.

In the accompanying drawings, in which similar letters of reference indicate like parts, Figure 1 is a plan view of a piece of chain or of a bracelet made of trefoil tubing and put together in accordance with my invention, a portion being shown in horizontal section. Fig. 2 is an edge view of the same. Fig. 3 is a plan of the reverse side. Fig. 4 is a central longitudinal vertical section. Fig. 5 is a piece of trefoil tubing from which the links are made. Fig. 6 is a view of three links and a wire staple disconnected. Fig. 7 is a central section of the same links and wire staple put together.

It will be observed that there are two styles of links, the links A having the central portion, a, of two its lobes burred out, and the links B having the ends b of two of its lobes burred out, as shown in Fig. 6. The portion B' of the link B fits into the portion a burred out from the link A, and the portions A' of the link A fit into the burred-out parts b of the link B. These links are alternated and laid as shown, one lobe B' of each link B being laid coincident with one lobe A' of each next link A. The wire staples C are then dropped in, as shown in Figs. 1 and 7—*i. e.*, through the lobes A' of each link A, which engage or are coincident with the lobes B' of the two links B next said link A, and, of course, through its next lobes—that is to say, each leg of the wire staple passes through one lobe B' of a link B and one lobe A' of a link A as clearly shown in Fig. 7. The ends of the staple C', Fig. 1, are then bent back upon themselves in the same lobes A' by suitable machinery, and, striking the lobes B', remain in position. By inserting the staple in the manner shown, the bent portion of each one lies in the two lobes A' of one end of a link A, and the hook portion C' lies in the same lobes A' at the opposite end of said link, thus being entirely out of sight, and adding not only to the neatness of the bracelet, but to its capacity for edge ornamentation. It will be noticed that this construction and arrangement of links produces a chain which is different in appearance on its opposite sides.

Fig. 8 is a plan view, and Fig. 9 an edge view, of a bracelet or chain made of quarterfoil tubing on the same principle; and Fig. 10 shows a piece of the said tubing.

Having thus fully described my invention, what I claim, and desire to secure by Letters Patent, is—

1. An ornamental chain or bracelet the links of which are constructed of trefoil or quarterfoil tubing, otherwise known as "clover-leaf wire," said links being suitably secured together, as an improved article of manufacture.

2. An ornamental chain or bracelet the links of which are constructed of trefoil or quarterfoil tubing laid side by side, and secured together by means of wire staples, substantially as and for the purpose set forth.

3. An ornamental chain or bracelet, the links of which are constructed of trefoil or quarterfoil tubing laid side by side, and secured together by the wire staples C, having the bent-back ends C', substantially as and for the purpose described.

LOUIS HECKMANN.

Witnesses:
J. E. POND, Jr.,
GEO. B. CALDWELL.